(No Model.)
G. TROUVÉ.
FISHING NET.
No. 528,350. Patented Oct. 30, 1894.
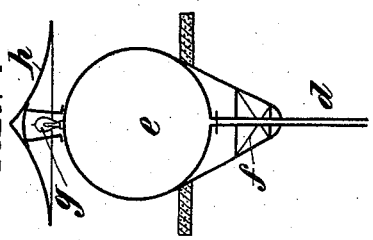
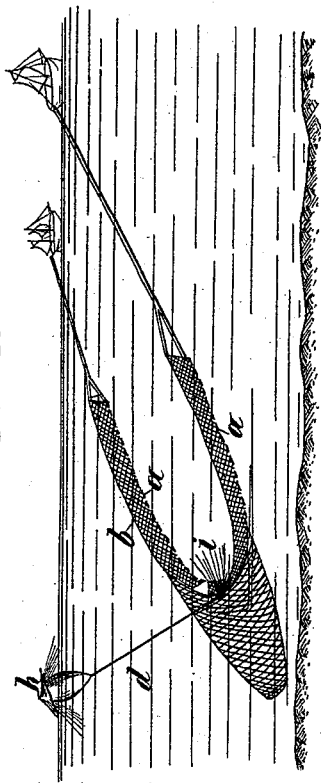
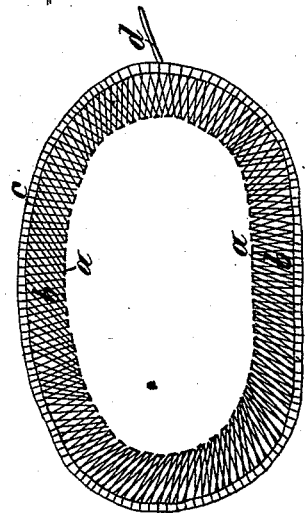
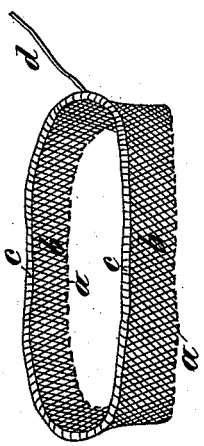
Witnesses:
Inventor
Gustave Trouvé,
By Briesen & Knauth
his Attorneys.

UNITED STATES PATENT OFFICE.

GUSTAVE TROUVÉ, OF PARIS, FRANCE.

FISHING-NET.

SPECIFICATION forming part of Letters Patent No. 528,350, dated October 30, 1894.

Application filed November 2, 1893. Serial No. 489,797. (No model.)

*To all whom it may concern:*

Be it known that I, GUSTAVE TROUVÉ, of the city of Paris, France, have invented Improvements in and Connected with Fishing-Nets, of which the following is a full, clear, and exact description.

My invention relates to fishing-nets and has for its object to effect the lifting of the net, or a part thereof, automatically and from a distance and with this object an inflatable tube is applied to the edge of the net and means are provided whereby it may be inflated at will, in order to act as a float to raise the net when required.

The invention also relates to a luminous buoy forming a reservoir of compressed air and provided with electric lighting and generating appliances serving also to automatically control the admission of the compressed air to the inflatable float of the net.

Reference is to be had to the accompanying drawings, forming part of this specification, wherein—

Figure 1 shows a circular net laid flat on the bottom and Fig. 2 shows the same net when raised automatically. Fig. 3 shows what may be designated a corridor or gangway net whose ends may be raised automatically. Fig. 4 illustrates the invention applied to a seine net. Figs. 5 and 6 are cross-sections of the pneumatic tube in its normal and inflated conditions. Fig. 7 is a vertical section of a luminous buoy containing compressed air and an electric battery.

The same letters of reference denote like parts in all the figures.

As shown in Fig. 1, the foot-rope $a$ of the sweep net or trammel $b$ is weighted and the head-rope is constituted by an india-rubber tube $c$ which is normally collapsed, as shown in Fig. 5, and is connected by a tube $d$ with a compressed air reservoir, or with a pump, the reservoir being placed either on board a boat or on shore or contained in a buoy as at $e$, Fig. 7.

When it is required to raise a part or the whole of the net, compressed air is admitted to the tube $c$ which when inflated acts as a float to raise the net.

In applying the invention to a seine such as shown in Fig. 4, the buoy connected to it contains a compressed air reservoir $e$ and a primary or secondary battery $f$ and mechanism actuated electrically under the control of a commutator at a distance either on board the boat or on shore, for opening the cock controlling the supply of the compressed air to the inflatable tube $c$. The buoy may carry an electric lamp surmounted by a reflector $h$ in order to indicate the location of the net, and at the point of connection $i$ of tube $d$ with the net there may be placed another lamp for the purpose of attracting the fish into the pocket of the net.

It is to be understood that the invention is not limited to the arrangements illustrated which may be varied in form, arrangement, materials, and accessories, and be applied generally to all kinds of fishing nets.

I claim—

1. The combination, with a fishing net, of a pneumatic tube applied along the edge of the net and adapted when inflated to serve as a float therefor and of a tube connecting the said inflatable tubular float with a supply of air under pressure whereby to enable the pneumatic float to be inflated at will and from a distance, as specified.

2. The combination, with a fishing net having an inflatable tubular float applied thereto, as described, of a buoy containing compressed air connected with the inflatable tube by a tube controlled by an electrically-operated valve for the purpose of inflating the pneumatic float at will and from a distance, as specified.

3. In combination with a fishing net provided with an inflatable tubular float, the herein described buoy containing a reservoir of compressed air for supplying the pneumatic float, and electric generators of the current setting in motion the mechanism for operating the valve which controls the air supply to the float and for supplying an electric lamp by which the location of the buoy may be ascertained at night, substantially as specified.

The foregoing specification of my improvements in and connected with fishing-nets signed by me this 14th day of October, 1893.

GUSTAVE TROUVÉ.

Witnesses:
 CLYDE SHROPSHIRE,
 ALBERT MOREAU.